United States Patent [19]

Brockhaus

[11] Patent Number: 5,052,878
[45] Date of Patent: Oct. 1, 1991

[54] RETRACTABLE BED FOR TRUCK

[75] Inventor: Peter B. Brockhaus, Owen, Wis.

[73] Assignee: Donald Volhard, Marathon City, Wis.

[21] Appl. No.: 389,412

[22] Filed: Aug. 4, 1989

[51] Int. Cl.$^5$ .............................................. B60P 1/00
[52] U.S. Cl. .................................. 414/522; 296/37.6;
312/334; 312/350; 224/42.44
[58] Field of Search .............................. 414/522, 462;
224/42.43, 42.44; 296/37.1, 37.6, 156; 312/215,
334, 330.1, 342, 345, 349, 350; 108/143, 102

[56] References Cited

U.S. PATENT DOCUMENTS

| | | | |
|---|---|---|---|
| 3,768,673 | 10/1973 | Nydam et al. | 414/522 |
| 4,705,315 | 11/1987 | Cherry | 296/37.6 X |
| 4,909,558 | 3/1990 | Roshinsky | 296/37.6 |

FOREIGN PATENT DOCUMENTS

| | | | |
|---|---|---|---|
| 262928 | 7/1968 | Austria | 312/334 |
| 2607435 | 9/1977 | Fed. Rep. of Germany | 312/334 |
| 3346797 | 5/1985 | Fed. Rep. of Germany | 312/350 |
| 3521247 | 12/1985 | Fed. Rep. of Germany | 414/522 |
| 2579146 | 9/1986 | France | 414/522 |
| 372872 | 5/1932 | United Kingdom | 312/342 |
| 2105296 | 3/1983 | United Kingdom | 414/522 |

*Primary Examiner*—Frank E. Werner
*Attorney, Agent, or Firm*—Fuller, Ryan & Hohenfeldt

[57] ABSTRACT

An improved retractable bed comprises two or more telescoping rail packs with a deck attached therebetween for supporting a cargo. Each rail pack comprises a strong and rigid intermediate rail interposed between a base rail fixed to a support surface and a primary rail. The intermediate rail has one set of support rollers for rolling along the base rail, and a second set of support rollers for rollingly supporting the primary rail. Two sets of guide rollers laterally retain the intermediate rail to the base rail and the intermediate rail to the primary rail. The present invention includes caliper brakes that act between the primary rail and base rail to selectively lock the rail packs at desired locations. A screw and handle mechanism may also be used to translate the retractable bed and to lock it relative to a support surface.

13 Claims, 3 Drawing Sheets

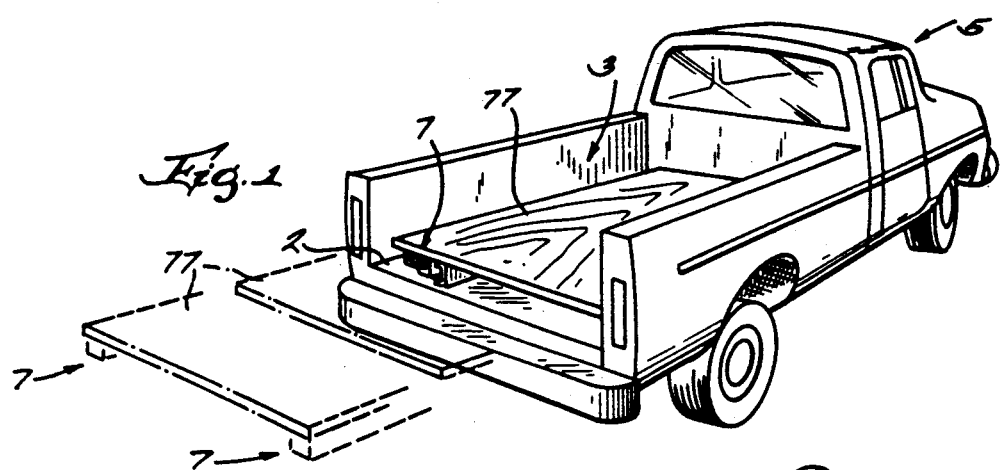
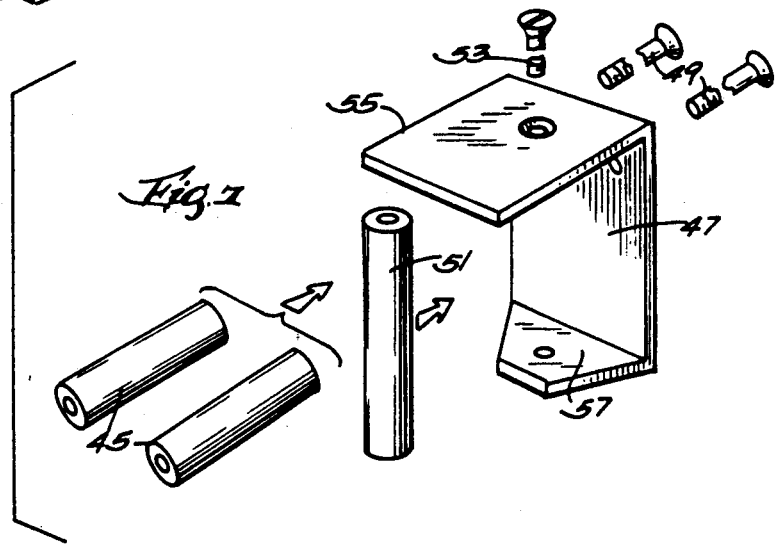
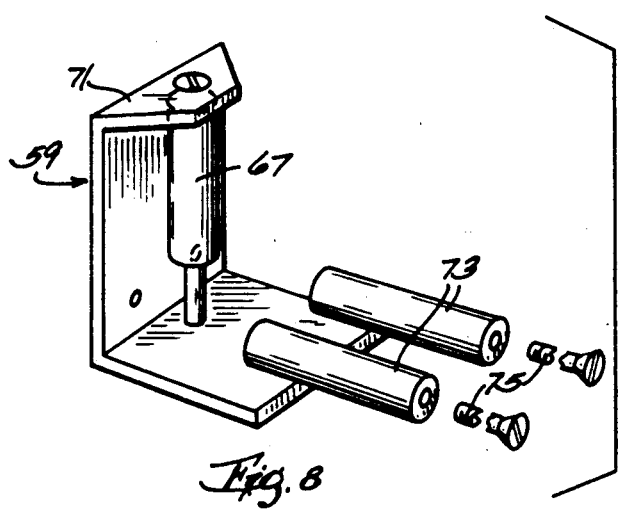
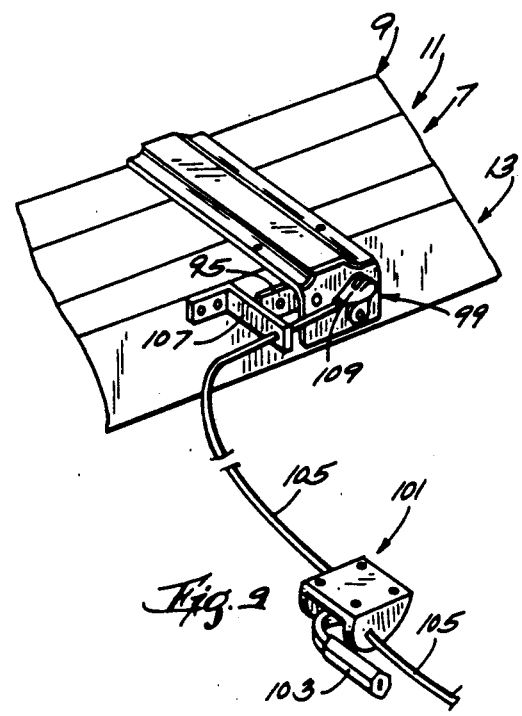

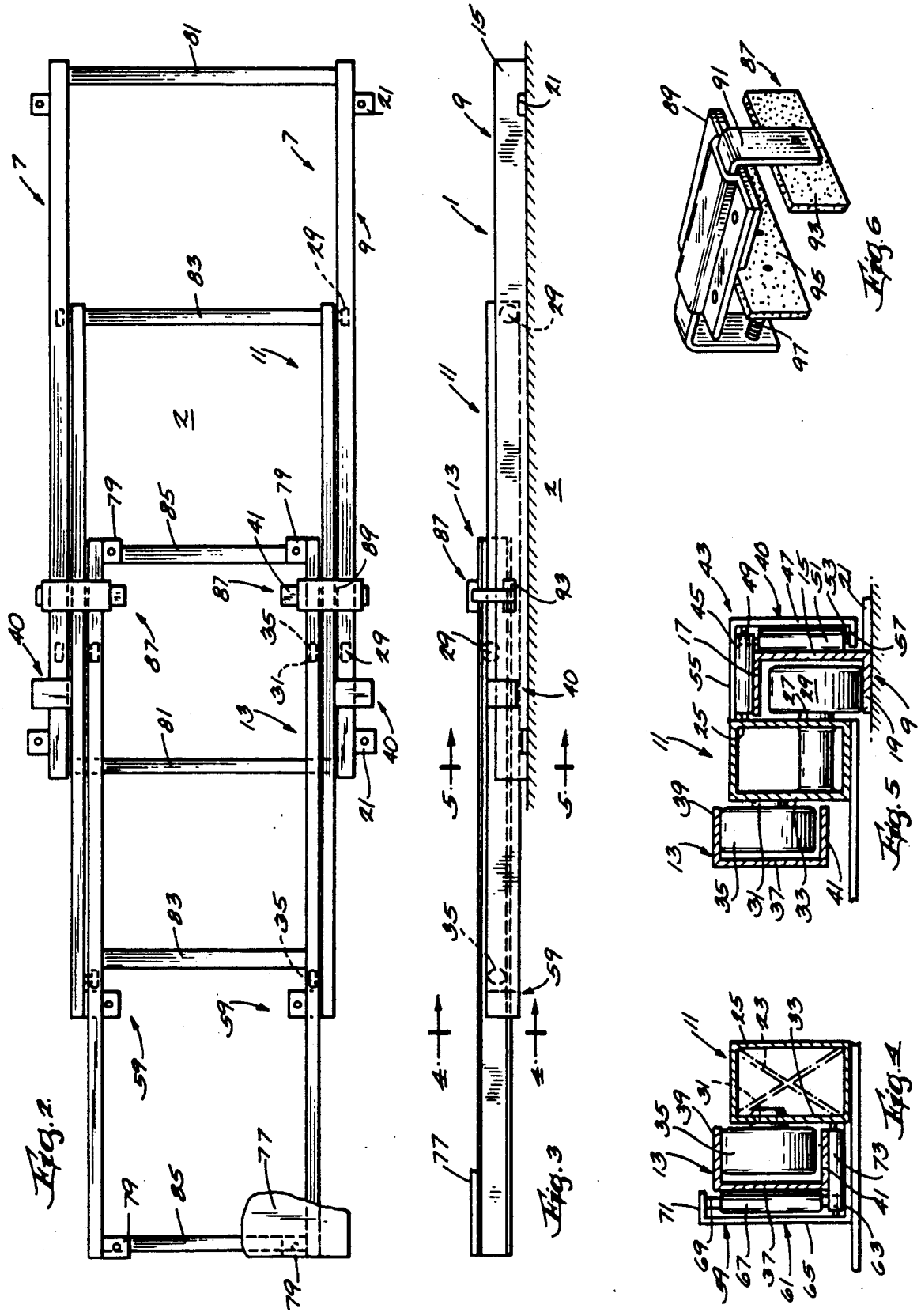

RETRACTABLE BED FOR TRUCK

BACKGROUND OF THE INVENTION

1. Field of the Invention

This invention pertains to cargo transportation, and more particularly to apparatus that facilitates loading and unloading cargo from a vehicle.

2. Description of the Prior Art

It is well known to install retractable platforms on the beds of trucks to support and move the truck cargo. A primary difficulty in designing and constructing such platforms is obtaining sufficient cargo carrying capacity and travel from lightweight and small volume components. My U.S. Pat. No. 4,950,123 describes an exemplary retractable truck bed that solves many problems associated with telescoping cargo supports. Other examples of such structures may be seen in U.S. Pat. Nos. 4,268,213; 4,303,367; and 4,305,695.

It has been found desirable to incorporate greater strength and rigidity into retractable cargo beds. Further, improved means for locking the beds in place on the truck frame is also desirable. Thus, a need exists for improvements in retractable truck beds.

SUMMARY OF THE INVENTION

In accordance with the present invention, a retractable bed for trucks is provided that has greater safety and cargo carrying capacity then prior devices. This is accomplished by apparatus that includes a load carrying suspension system having improved structural properties and arrangements for rollingly supporting the cargo.

The cargo is supported on a deck that in turn is fastened to two or more parallel rail packs. Each rail pack has a base rail, which is mounted to the truck bed, and a primary rail. The deck is attached to the primary rails, and the primary rails roll along the respective base rails to move the load. The rails move relative to each other in telescoping fashion between a retracted nested configuration and an extended configuration.

To increase the length of travel of the retractable bed, each rail pack may also include one or more intermediate rails between the base and primary rails. To obtain maximum strength and rigidity from the rails, the intermediate rail is fabricated with a tubular cross section, and it may include internal cross bracing.

In a three rail system, all the rollers are mounted to the intermediate rail. A set of support rollers supports the rails in the vertical direction for longitudinal extending and retracting. A set of guide rollers retain the rails laterally to each other to keep them in parallel and side-by-side relationship.

Further in accordance with the present invention, the retractable bed includes a safety brake system associated with the telescoping rail packs. The brake system comprises a caliper brake having brake pads that engage the base and primary rails to prevent relative motion therebetween. The caliper brake is normally in the operative mode, and a person must actuate a control cable mechanism to release the brake and allow the cargo to be moved along the truck bed.

Alternately, the brake system may be combined with means for translating the retractable bed and cargo. In that design, a long screw is axially captured in the retractable bed cargo deck. The screw is also received in a nut mounted to the truck bed. A handle is pivotally attached to the end of the screw. By pivoting the handle to an open configuration and turning it, the screw causes the deck to translate along the truck bed. The handle can be pivoted to a closed configuration against the deck, thereby preventing the screw from turning and the platform from translating.

Other objects, advantages, and features of the invention will become apparent to those skilled in the art upon reading the disclosure.

BRIEF DESCRIPTION OF THE DRAWINGS

FIG. 1 is a perspective view of the present invention mounted to a pick-up truck.

FIG. 2 is a top view of the present invention.

FIG. 3 is a side view of the present invention.

FIG. 4 is an enlarged cross sectional view taken along lines 4—4 of FIG. 3.

FIG. 5 is an enlarged cross sectional view taken along lines 5—5 of FIG. 3.

FIG. 6 is a perspective view of a brake that is advantageously used with the retractable bed of the present invention.

FIG. 7 is an enlarged exploded perspective view of a first lateral retainer used with the retractable bed of the present invention.

FIG. 8 is an enlarged exploded perspective view of a second lateral retainer used with the retractable bed of the present invention.

FIG. 9 is a perspective view of the caliper brake of FIG. 6 shown in place on the retractable bed of the present invention.

DETAILED DESCRIPTION OF THE INVENTION

Figure 10:
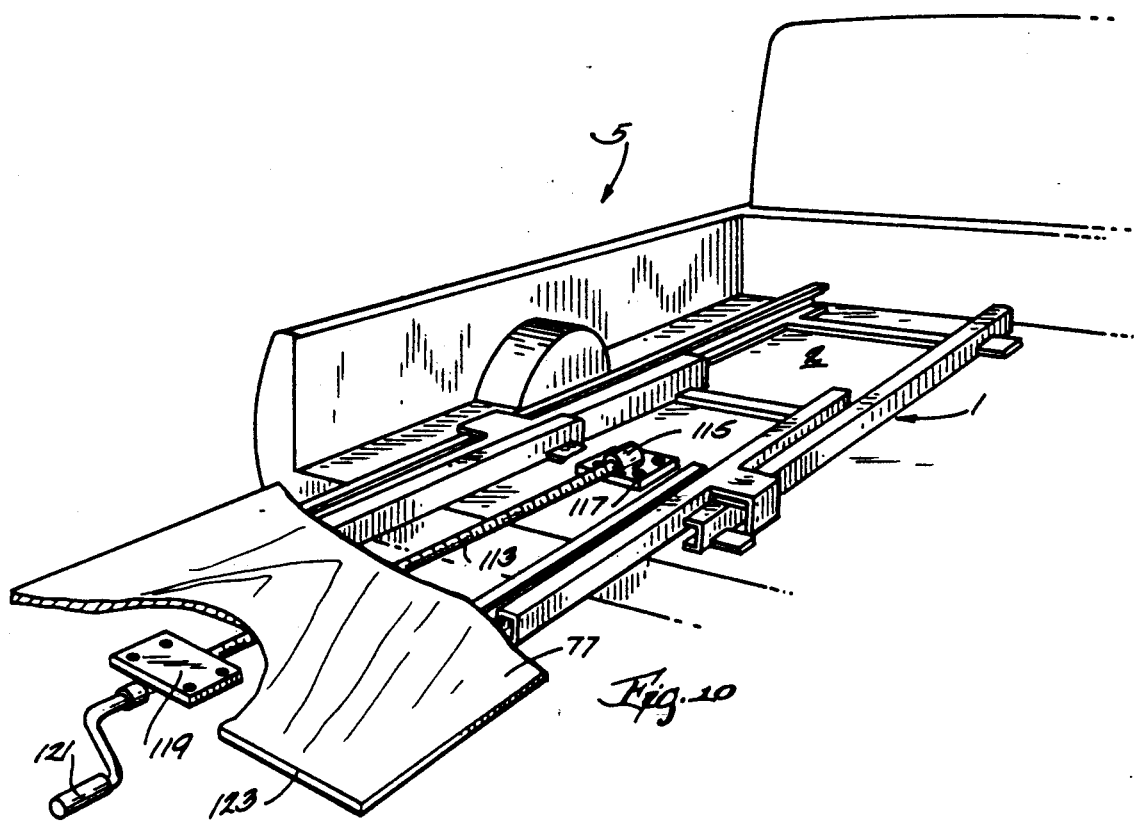
FIGS. 10 and 11 are perspective views of alternate means for securing the retractable bed of the present invention at selected locations.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIG. 1, a retractable bed 1 is illustrated that includes the present invention. The retractable bed is shown mounted to the floor 2 of the cargo carrying area 3 of a conventional pick-up truck 5. However, it will be understood that the invention is not limited to use in automotive applications.

Referring also to FIGS. 2-5, the retractable bed 1 comprises at least two rail packs 7. Each rail pack 7 comprises two or more rails that are telescopically slidable relative to each other between a retracted configuration wherein the rails are nested adjacent each other, and an extended configuration wherein the rails are longitudinally displaced relative to each other. In the illustrated construction, three rails are employed with each rail pack, a base rail 9, an intermediate rail 11, and a primary rail 13.

The base rail 9 is preferably made of a steel channel, with an upstanding base leg 15 and opposed top and bottom side legs 17 and 19, respectively. The base rail is mounted to the truck floor 2 or other support surface by plates 21 welded to the base rail. Alternately, in a construction not illustrated, the base rail may include a long auxiliary plate welded to the base rail and holes punched in said plate 21 at predetermined locations to mount to the truck frame with bolts or the like. Alternately, in a construction not illustrated, the base rail may include a long continuous flange welded, extruded or roll formed at the outside surface of the bottom leg 19 with the width of said continuous flange being used for mounting the base rail to the truck floor. Mounting holes then can be field-drilled anywhere through the length of said mounting flange for mounting bolts or the like to fasten to the truck frame. This is especially important since one model of telescoping cargo support will fit any model of truck since mounting holes can be drilled where needed to fasten to the truck frame, both lengthwise and crosswise, whereas in the aforementioned design with mounting plate 21, punched holes are at predetermined locations for each specific model, make and year of truck requiring a specific model of telescoping cargo support to fit each different truck.

The intermediate rail 11 is preferably fabricated from a tube, which may be rectangular in cross section. To increase the strength and rigidity of the intermediate rail, it may have internal x-bracing, as is indicated by phantom lines 23 in FIG. 4. Welded to the outside side wall 25 of the intermediate rail are a pair of studs 27. Rotatably mounted on the studs 27 are respective support rollers 29. The rollers 29 are designed to ride longitudinally along the inside surface of the base rail bottom leg 19, with the intermediate rail being in close lateral proximity to the base rail. The intermediate rail further comprises a pair of studs 31 fixed to the inside side wall 33. Rotatably mounted to each stud 31 is a support roller 35.

The primary rail 13 of each rail pack 7 is designed as a steel channel with a base leg 37, a top leg 39, and a bottom leg 41. The primary rail is supported on and rolls longitudinally along the intermediate rail 11 by means of the primary rail top leg 39 being supported by the support rollers 35 mounted to the intermediate rail inside side wall 33.

To retain the base rail 7, intermediate rail 11, and primary rail 13 together laterally in each rail pack 7, a pair of lateral retainers are employed. The first lateral retainer is indicated at reference numeral 40 in FIGS. 2, 3, 5, and 7. The first lateral retainer 40 is used to laterally retain the base rail and intermediate rail to each other. The first lateral retainer comprises a generally L-shaped bracket 43 having a top leg 55 that is attached, as by welding, to the upper portion of the intermediate rail. Mounted for rotation about respective horizontal axis are a pair of guide rollers 45. The guide rollers 45 are supported between the bracket side leg 47 and the intermediate rail outside side wall 25 by respective screws or pins 49. The guide rollers 45 are in a position to contact and roll along the upper surface of the base rail top leg 17. However, the major portion of the forces acting between the intermediate rail and base rail is transmitted by the support rollers 29.

The lateral retainer 40 also includes a vertical guide roller 51. The vertical guide roller 51 is mounted for rotation in the L-shaped bracket 43 by a screw or pin 53 that extends between the bracket top leg 55 and a short inturned ledge 57. The guide roller 51 is located so as to roll along the base leg 15 of the base rail 9. In that manner, the base rail and intermediate rail 11 are laterally retained to each other.

The second lateral retainer 59 is shown in FIGS. 2, 3, 4, and 8. The second lateral retainer 59 comprises a generally L-shaped bracket 61 having a bottom leg 63 that is welded to the intermediate rail 11 and a side leg 65. A vertically oriented guide roller 67 is mounted by a pin or screw 69 between the bracket bottom leg 63 and a short ledge 71. Straddling the guide roller 67 are a pair of similar guide rollers 73 mounted by respective pins or screws 75 between the bracket side leg 65 and the inside side wall 33 of the intermediate rail. The guide rollers 73 are able to contact the undersurface of the primary rail bottom leg 41. The vertical guide roller 67 rolls along the primary rail base leg 37 to laterally retain the intermediate and primary rails to each other.

A platform or deck 77 is mounted to the rail packs 7 by means of mounting plates 79 welded to the primary rails 13. See FIGS. 1–3. Although not necessary for the proper operation of the retractable bed 1, the rail packs may be tied together with transverse spacers joined between one or more corresponding rails. In FIG. 2, for example, spacers 81 are shown joined between the base rails 9, spacers 83 connect the intermediate rails 11, and spacers 85 are shown connecting the primary rails 13.

To assure the safety of persons using the retractable bed 1, as well as of the cargo placed on the bed deck 77, the present invention includes a safety brake. Looking at FIGS. 2, 3, and 6, a caliper type safety brake 87 is shown associated with each rail pack 7. Each safety brake 87 comprises a mounting plate 89 fastened to the primary rail 13 for rolling therewith relative to the base rail 9 and intermediate rail 11. Slidingly received in the mounting plate 89 is a generally U-shaped bracket 91, to one end of which is attached a first brake pad 93. A second brake pad 95 is slidingly mounted to the plate 89. The brake pads 93 and 95 are spaced apart so as to straddle the rail pack. Pad 93 bears against the base leg 15 of the base rail. Pad 95 bears against the primary rail base leg 37. Springs 97 bias the brake pads into a normally operative mode wherein they are in locking contact with the base and primary rails to prevent rail movement.

To control the brakes 87, a cable-cam system 99 is employed, FIG. 9. The cable-cam system 99 comprises a control device 101 mounted to the underside of the deck 77, not shown in FIG. 9. A pivotable handle 103 is connected to a pair of sheathed control cables 105. The cables 105 pass through respective cable brackets 107 mounted to the primary rails 13. A clevice 109 fixed to the end of each cable is pivotally joined to a lever and cam arrangement 111 on the brake. Pivoting the controlled device handle 103 actuates the lever and cam arrangements 111 to force the brake pads 93 and 95 into an inoperative mode against the springs 97 and out of contact with the respective base and primary rails. With the pads in the inoperative mode, the rails are able to roll relative to each other. Returning the handle 103 to the operative position enables the springs to again force the brake pads into operative engagement with the rails to lock the retractable bed against movement.

Figure 11:
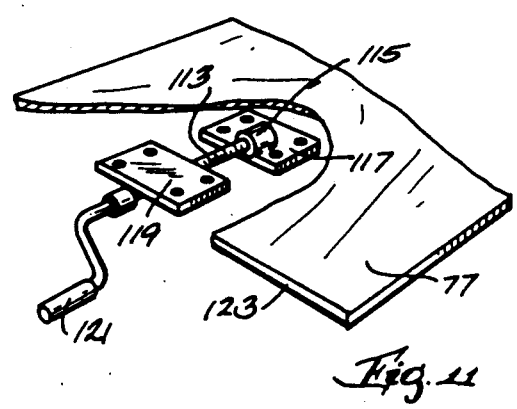

Now turning to FIGS. 10 and 11, an alternate structure for securing the retractable bed 1 at selected locations is shown. The retractable bed in FIGS. 10 and 11 includes a long screw 113 that is rotatably received in a nut 115 secured to an anchor plate 117. The anchor plate 117 is fastened to the floor 2 of the truck 5. The screw 113 is axially captured in a housing 119 that is fastened to the underside of the deck 77. To the end of the screw is pivotally mounted a handle 121. The handle 121 is pivotable to an open position, as shown in FIG. 10, wherein it is clear of the deck front edge 123. In the open position, the handle can be turned to translate the deck along the truck floor. With the deck at a desired location, the handle is pivoted to the closed position of FIG. 11. In the closed position, the handle lies against the deck undersurface and cannot rotate. Consequently, the retractable bed is fixed until the handle is intentionally pivoted back to the open position of FIG. 10.

Thus, it is apparent that there has been provided, in accordance with the invention, an improved retractable bed for trucks that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A retractable bed comprising:
   a. a plurality of generally horizontal rail packs transversely spaced on a fixed support, each rail pack comprising:
      i. an elongated base rail mounted to the fixed support, wherein the base rail comprises an elongated channel having a base leg, a top leg, and a bottom leg;
      ii. an elongated intermediate rail spaced horizontally from the base rail, wherein the intermediate rail comprises an elongated tube with opposed, coextensive first and second side walls, at least two first support rollers mounted to the first side wall for rollingly supporting the intermediate roll along the base rail bottom leg, and at least two second support rollers rollingly mounted to the second side wall;
      iii. an elongated primary rail adjacent the intermediate rail second side wall and parallel thereto, wherein the primary rail comprises an elongated channel having a top leg, a bottom leg, and a base leg, the primary rail top leg being in support contact with the second support rollers mounted to the intermediate rail second side wall;
      iv. first guide roller means mounted to the first wall of the intermediate rail for laterally retaining the intermediate rail to the base rail; and
      v. second guide roller means mounted to the second wall of the intermediate rail for laterally retaining the primary rail to the intermediate rail; and
   b. a deck fastened to the primary rails,
   so that cargo can be loaded on the deck and translated along the rail packs.

2. The retractable bed of claim 1 wherein the intermediate rail first guide roller means comprises:
   a. a first bracket joined to the intermediate rail;
   b. at least one first guide roller rotatably mounted between the first bracket and the intermediate rail and located to rollingly contact the base rail top leg; and
   c. at least one second guide roller rotatably mounted in the first bracket and located to rollingly contact the base rail base leg to thereby laterally retain and guide the base rail and the intermediate rail.

3. The retractable bed of claim 1 wherein the intermediate rail second guide roller means comprises:
   a. at least one second bracket joined to the intermediate rail;
   b. at least one first guide roller mounted between the second bracket and the intermediate rail and located to rollingly contact the primary rail bottom leg; and
   c. at least one second guide roller rotatably mounted in the second bracket and located to rollingly contact the primary rail base leg to thereby laterally retain and guide the intermediate rail and the primary rail.

4. The retractable bed of claim 1 further comprising caliper brake means acting between the base rail and the primary rail for selectively preventing relative motion therebetweeen.

5. The retractable bed of claim 1 further comprising screw means acting between the deck and the fixed support for selectively translating the deck along the fixed support and for locking the deck at a desired location along the fixed support.

6. In combination with a motor vehicle having a horizontal floor, a retractable bed for translating a cargo along the vehicle floor comprising:
   a. at least two elongated transversely spaced base rails mounted to the vehicle floor and extending longitudinally therealong, each base rail comprising a channel having base, top, and bottom legs;
   b. an elongated primary rail associated with each base rail and comprising a channel having base, top, and bottom legs and being transversely spaced from and parallel to the base rail;
   c. an elongated intermediate rail interposed between each base rail and primary rail, each intermediate rail having first and second horizontally opposed, coextensive vertical walls;
   d. first support roller means mounted to the first wall of each intermediate rail for providing rolling support between the base and intermediate rails;
   e. second support roller means mounted to the second wall of each intermediate rail for providing rolling support of the primary rail on the associated intermediate rail;
   f. first guide means mounted to each intermediate rail and in rolling contact with the associated base rail for preventing lateral separation between the base and intermediate rails;
   g. second guide means mounted to each intermediate rail in rolling contact with the associated primary rail for preventing lateral separation between the intermediate rail and the primary rail; and
   h. deck means attached to the primary rails for supporting the cargo for translation along the vehicle floor.

7. The combination of claim 6 wherein the intermediate rail first guide means comprises:
   a. at least one first bracket joined to the intermediate rail first side wall;
   b. at least one first guide roller mounted between the first bracket and the intermediate rail first side wall and being contactable with the base member top leg; and
   c. at least one second guide roller mounted in the first bracket and being contactable with the base rail base leg to thereby prevent lateral separation of the intermediate rail from the base rail.

8. The combination of claim 6 wherein the intermediate rail second guide means comprises:
   a. at least one second guide bracket mounted to the intermediate rail second side wall;
   b. at least one first guide roller mounted between the second bracket and the intermediate rail second side wall and being contactable with the primary rail bottom leg; and c. at least one second guide roller mounted in the second bracket and being contactable with the primary rail base leg to thereby prevent lateral separation of the intermediate rail from the primary rail.

9. The combination of claim 6 further comprising caliper brake means acting between at least one base rail and the associated primary rail for selectively preventing relative motion therebetween.

10. The combination of claim 6 further comprising screw means acting between the deck means and the vehicle floor for selectively translating the deck along the vehicle floor and for locking the deck at a desired location along the vehicle floor.

11. Apparatus for providing longitudinal motion to an article along a fixed support comprising:
 a. an elongated base rail mounted to the fixed support, wherein the base rail is formed as a channel having a base leg, a top leg, and a bottom leg;
 b. an elongated primary rail transversely spaced from the base rail and generally parallel thereto, wherein the primary rail is formed as a channel having a base leg, a top leg, and a bottom leg;
 c. an intermediate rail interposed between the base rail and the primary rail,
 the intermediate rail comprising:
 i. a tube having first and second opposed, coextensive side walls;
 ii. first support rollers mounted to the tube first side wall and rollingly supporting the tube on the base rail; and
 iii. second support rollers mounted to the tube second wall and rollingly supporting the primary rail on the intermediate rail; and
 d. first lateral guide means comprising:
 i. at least one first bracket joined to the intermediate rail;
 ii. at least one first guide roller mounted between the first bracket and the intermediate rail and being contactable with the base rail top leg; and
 iii. at least one second guide roller mounted in the first bracket and being contactable with the base rail base leg to thereby laterally retain the intermediate rail to the base rail,
so that an article placed on the primary rail is longitudinally movable along the fixed support.

12. The apparatus of claim 11 further comprising:
 a. at least one second bracket joined to the intermediate rail;
 b. at least one first guide roller mounted between the second bracket and the intermediate rail and being contactable with the primary rail bottom leg; and
 c. at least one second guide roller mounted in the second bracket and being contactable with the primary rail base leg to thereby laterally retain the intermediate rail to the primary rail.

13. The apparatus of claim 11 further comprising caliper brake means acting between the primary rail and the base rail for selectively enabling and preventing longitudinal motion of the base rail, intermediate rail, and primary rail.

* * * * *